(12) United States Patent
Hansson

(10) Patent No.: US 12,545,317 B2
(45) Date of Patent: Feb. 10, 2026

(54) METHOD FOR SYNCHRONIZING A ROTATORY POSITION OF A STEERING WHEEL TO AN ANGULAR POSITION OF A ROAD WHEEL

(71) Applicant: Volvo Car Corporation, Gothenburg (SE)

(72) Inventor: Anders Hansson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 64 days.

(21) Appl. No.: 18/441,287

(22) Filed: Feb. 14, 2024

(65) Prior Publication Data

US 2024/0278825 A1 Aug. 22, 2024

(30) Foreign Application Priority Data

Feb. 17, 2023 (EP) .................... 23157317

(51) Int. Cl.
*B62D 5/04* (2006.01)
*B62D 5/00* (2006.01)
(Continued)

(52) U.S. Cl.
CPC ........... B62D 5/0466 (2013.01); *B62D 5/001* (2013.01); *B62D 6/005* (2013.01); *B62D 15/029* (2013.01); *B62D 15/021* (2013.01)

(58) Field of Classification Search
CPC .. B62D 15/0245; B62D 6/005; B62D 15/029; B62D 5/001; B62D 5/0466;
(Continued)

(56) References Cited

U.S. PATENT DOCUMENTS 10,011,296 B2 7/2018 Ford
11,052,940 B1 * 7/2021 Narasimhan ........... B62D 6/008
(Continued)

FOREIGN PATENT DOCUMENTS

DE 102017217581 A1 4/2019
DE 102019107768 A1 10/2019

OTHER PUBLICATIONS

Search report issued for EP Application No. 23157317.1, mailed on Jul. 14, 2023, 12 pages.

*Primary Examiner* — Hai H Huynh
*Assistant Examiner* — Johnny H Hoang
(74) *Attorney, Agent, or Firm* — Raj S. Dave; Dave Law Group LLC

(57) ABSTRACT

According to an embodiment, it is a method for synchronizing the rotatory position (β) of the steering wheel to the angular position (α) of the road wheel comprising, causing at least one of a steering wheel to move into a steering wheel end stop position, wherein a rotatory position (β) of the steering wheel end stop position is known, and causing a road wheel to move into a road wheel end stop position, wherein an angular position (α) of the road wheel end stop position is known; causing the steering wheel to move into a neutral steering wheel position based on the rotatory position (β) of the steering wheel end stop position using a first incremental position sensor, and causing the road wheel to move into a neutral road wheel position based on the angular position (α) of the road wheel end stop position using a second incremental position sensor.

20 Claims, 1 Drawing Sheet

(51) Int. Cl.
    *B62D 6/00* (2006.01)
    *B62D 15/02* (2006.01)
(58) Field of Classification Search
    CPC .. B62D 5/0457; B62D 15/021; B62D 5/0469;
        B62D 5/049; B62D 15/02; B62D 5/0433;
        B62D 5/0478; B62D 7/224; B60T
        8/17558; B60T 7/12; B60T 2260/02;
        B60T 2270/413; B60T 2210/32; B60T
        2270/402; B60T 2201/02; B60W 10/184;
        B60W 40/105; B60W 10/20; B60W
        30/14; B60W 30/06; B60W 50/023;
        B60W 50/0205; B60W 50/029; B60W
        2540/215; B60W 2050/0292; B60W
        2050/0297; B60W 2050/0295; B60W
        2050/021; G05D 1/021; G05D 1/0077
    See application file for complete search history.

(56) References Cited

U.S. PATENT DOCUMENTS

| | | | |
|---|---|---|---|
| 12,179,856 B2* | 12/2024 | Washnock | B62D 5/0406 |
| 2018/0141584 A1* | 5/2018 | El Aile | B62D 5/0433 |
| 2019/0300052 A1* | 10/2019 | Allan | B62D 15/0245 |
| 2020/0189651 A1* | 6/2020 | Hansson | B62D 5/006 |

* cited by examiner

METHOD FOR SYNCHRONIZING A ROTATORY POSITION OF A STEERING WHEEL TO AN ANGULAR POSITION OF A ROAD WHEEL

CROSS-REFERENCE TO RELATED APPLICATIONS

This application claims the benefit of European Patent Application Number 23157317.1, filed on Feb. 17, 2023, which is hereby incorporated by reference in its entirety.

FIELD OF INVENTION

The present disclosure relates to a method for synchronizing a rotatory position of a steering wheel to an angular position of a road wheel. The steering wheel and the road wheel are coupled to a steering system for a vehicle.

BACKGROUND

In situations in which the synchronization has been lost, the rotatory position of the steering wheel needs to be synchronized to the angular position of a road wheel before the vehicle may start. Otherwise, the vehicle may not be steered in a reliable manner.

Therefore, there is a need for a simple and reliable method for synchronizing a rotatory position of a steering wheel to an angular position of a road wheel.

SUMMARY

The present disclosure relates to a method for synchronizing a rotatory steering wheel position of a steering wheel to an angular road wheel position of a road wheel. The steering wheel and the road wheel are coupled to a steering system for a vehicle.

The present disclosure is also directed to a method for starting a vehicle.

The present disclosure is additionally directed to a data processing apparatus, a computer program, and a computer-readable storage medium.

Furthermore, the present disclosure relates to a steering system for a vehicle.

In order to be able to precisely operate a steering system, a rotatory steering wheel position of a steering wheel needs to be synchronized to an angular road wheel position of a road wheel. This means that any rotatory steering wheel position needs to be associated with one angular road wheel position. This allows a user of the steering system to which the steering wheel and the at least one road wheel are coupled to precisely steer the vehicle.

In situations in which the synchronization has been lost, the rotatory steering wheel position of the steering wheel needs to be synchronized to the angular road wheel position of a road wheel before the vehicle may start. Otherwise, the vehicle may not be steered in a reliable manner.

It is an objective of the present disclosure to provide a simple and reliable method for synchronizing a rotatory steering wheel position of a steering wheel to an angular road wheel position of a road wheel.

The problem is at least partially solved or alleviated by the subject matter of the independent claims of the present disclosure, wherein further examples are incorporated in the dependent claims.

According to a first aspect, there is provided a method for synchronizing a rotatory steering wheel position of a steering wheel to an angular road wheel position of a road wheel. The steering wheel and the road wheel are coupled to a steering system for a vehicle. The method comprises:

causing the steering wheel to move into a steering wheel end stop position, wherein a rotatory position of the steering wheel end stop position is known, and/or causing the road wheel to move into a road wheel end stop position, wherein an angular position of the road wheel end stop position is known, causing the steering wheel to move into a neutral steering wheel position based on the known rotatory position of the steering wheel end stop position using an incremental position sensor detection result, and causing the road wheel to move into the neutral road wheel position based on the known angular position of the road wheel end stop position using an incremental position sensor detection result.

In the present context, the fact that the steering wheel and the road wheel are coupled to a steering system for a vehicle is to be understood in that the steering wheel and the road wheel are coupled to the same steering system. Synchronizing the rotatory steering wheel position of the steering wheel to an angular road wheel position of the road wheel means to establish a relationship between the rotatory steering wheel position and the angular road wheel position such that any rotatory steering wheel position is associated with one angular road wheel position. The neutral steering wheel position is the rotatory steering wheel position which is used to steer a corresponding vehicle straight ahead. Correspondingly, the neutral road wheel position is the angular road wheel position which makes a corresponding vehicle travel straight ahead. The present method uses the fact that a rotatory position of a steering wheel end stop position and/or an angular position of the road wheel end stop position is known. These positions are usually known using the neutral steering wheel position and/or the neutral road wheel position as a point of reference or origin. It is understood that the steering wheel only needs to be caused to move into the steering wheel end stop position if it is not already in the steering wheel end stop position. Analogously, the road wheel only needs to be caused to move into the road wheel end stop position if it is not already in the road wheel end stop position. It is noted that in a case in which both the road wheel and the steering wheel are moved into a respective end stop position, the end stop positions need to correspond to each other, i.e. both end stop positions are left end stop positions or both end stop positions are right end stop positions. Consequently, using the present method, a rotatory steering wheel position of a steering wheel and an angular road wheel position of a road wheel can be synchronized using incremental position sensors only. This means that the present method can be used in situations in which an absolute position of the steering wheel and/or an absolute position of the road wheel is unknown. This may be the case if one or more associated absolute position sensors are subject to an error on malfunction. The fact that only incremental sensors are necessary for executing the method has the consequence that redundant absolute position sensors are not necessary. This reduces the complexity of the steering system. Thus, the present method is comparatively simple and reliable.

In an example, the steering system is a steer-by-wire system. In such a system, the steering wheel and the road wheel may be moved independently from one another. In another example, the steering system is a mechanical steering system, i.e., a steering system comprising a mechanical coupling between the steering wheel and the road wheel.

In an example, the steering wheel is moved using a steering wheel actuator which may also be called a hand wheel actuator (HWA).

In an example, the method further comprises receiving at least one of the known rotatory position of the steering wheel end stop position and the known angular position of the road wheel end stop position from a data storage means. This is a simple and reliable manner of providing the known rotatory position of the steering wheel end stop position and/or the known angular position of the road wheel end stop position. These positions may of course be specific for each steering system and/or each vehicle. In a case in which only one of the known rotatory position of the steering wheel end stop position and the known angular position of the road wheel end stop position is received from the data storage means, the respective other one may be received from a position sensor means. The position sensor means may be an absolute position sensor. Thus, the known rotatory position of the steering wheel end stop position and/or the known angular position of the road wheel end stop position are always available.

In an example, the steering wheel end stop position is one of a left steering wheel end stop position and a right steering wheel end stop position. Additionally, or alternatively, the road wheel end stop position is one of a left road wheel end stop position and a right road wheel end stop position. It is noted that when executing the method, the steering wheel end stop position and the road wheel end stop position need to correspond to each other. This means that both need to relate to a left end stop position or a right end stop position.

In an example, the method further comprises:
  receiving an obstacle information relating to one of the left steering wheel end stop position and the right steering wheel end stop position and/or relating to one of the left road wheel end stop position and the right road wheel end stop position, and
  causing the steering wheel to move into the respective other steering wheel end stop position, and/or causing the road wheel to move into the respective other road wheel end stop position.

An obstacle information is generated if one of the left steering wheel end stop position and the right steering wheel end stop position cannot be reached. Additionally, or alternatively, an obstacle information is generated if one of the left road wheel end stop position and the right road wheel end stop position cannot be reached. In these cases, it is assumed that an obstacle blocks the movement of the steering wheel and/or the road wheel. Therefore, the steering wheel and/or the road wheel are moved into the respective other end stop position. Thus, the method may be executed in cases in which an obstacle blocks the movement of the road wheel and/or steering wheel. In other words, the method may be executed in a robust manner.

In an example, causing the steering wheel to move into a neutral steering wheel position comprises causing the steering wheel to move into an intermediate steering wheel position and causing the steering wheel to temporarily stop in the intermediate steering wheel position. Additionally, or alternatively, causing the road wheel to move into the neutral road wheel position comprises causing the road wheel to move into an intermediate road wheel position and causing the road wheel to temporarily stop in the intermediate road wheel position. This allows the steering wheel to be in the steering wheel end stop position for a comparatively short time only. Additionally, or alternatively, the road wheel may be in a road wheel end stop position for a comparatively short time only. This reduces wear.

In an example, causing the steering wheel to move into the first end stop position comprises receiving a confirmation that the steering wheel has reached the end stop position. This enhances the reliability of the method since situations in which the steering wheel has not properly reached the end stop position can be excluded.

In an example, causing the road wheel to move into the end stop position comprises receiving an abutment force information. The abutment force information may be used as an indicator whether the road wheel has properly reached the end stop position. Consequently, the method may be executed in a reliable manner.

In an example, the method further comprises receiving a reference abutment force information and comparing the reference abutment force information to the abutment force information. The comparison between the reference abutment force information and the abutment force information is also an indicator whether the road wheel has properly reached the end stop position. Thus, the method is very reliable.

In an example, the method triggers blocking the use of the steering system and the vehicle in a case in which the steering wheel has not properly reached the end stop position and/or in which the road wheel has not properly reached the end stop position.

In an example, the method further comprises triggering a warning message for a user of the vehicle while causing the steering wheel to move and/or while causing the road wheel to move. This allows the user of the vehicle to keep away from the moving steering wheel and/or the moving road wheel. This increases the safety of the user of the vehicle.

In an example, the method further comprises triggering a confirmation message for a user of the vehicle if the steering wheel has reached the neutral steering wheel position and the road wheel has reached the neutral road wheel position. Consequently, the user of the vehicle knows when it is safe to start using the steering wheel.

According to a second aspect, there is provided a method for starting a vehicle. The method comprises:
  determining that at least one of the rotatory steering wheel position and the angular road wheel position is unknown,
  executing the method for synchronizing a rotatory steering wheel position of a steering wheel to an angular road wheel position of a road wheel of any one of the preceding claims, and
  permitting a use of the steering system.

It is understood that in the first step, the rotatory steering wheel position and the angular road wheel position are to be understood as absolute positions. The determination may be based on an error message received from a position sensor being coupled to the steering wheel and/or a position sensor being coupled to the road wheel. The method for starting the vehicle may be executed at each vehicle start-up during a steering system check. Since the use of the steering system is only permitted after the method for synchronizing the rotatory steering wheel position of the steering wheel to the angular road wheel position of the road wheel has been performed, operational safety of the vehicle is increased. In a case in which the method for synchronizing the rotatory steering wheel position of the steering wheel to the angular road wheel position of the road wheel has not been successfully terminated, use of the steering wheel may be blocked. This additionally enhances the operational safety of the vehicle.

Both the method according to the first aspect of the present disclosure and the method of the second aspect of the present disclosure may be at least partly computer-implemented, and may be implemented in software or in hardware, or in software and hardware. Further, the methods may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

According to a third aspect, there is provided a data processing apparatus comprising means for carrying out at least one of the methods of the present disclosure. Thus, the data processing apparatus may comprise means for carrying out the method according to the first aspect and/or the method according to the second aspect. Using the data processing apparatus, a rotatory steering wheel position of a steering wheel and an angular road wheel position of a road wheel can be synchronized using incremental position sensors only. This means that the data processing apparatus can be used in situations in which an absolute position of the steering wheel and/or an absolute position of the road wheel is unknown. This may be the case if an absolute position sensor is subject to an error on malfunction. As has been mentioned before, only incremental sensors are necessary for executing the method. This has the effect that redundant absolute position sensors are not necessary. This reduces the complexity of the steering system. Moreover, operational safety of a vehicle using such a steering system is enhanced.

According to a fourth aspect, there is provided a computer program comprising instructions which, when the computer program is executed by a computer, cause the computer to carry out the method of the present disclosure. Using the computer program, a rotatory steering wheel position of a steering wheel and an angular road wheel position of a road wheel can be synchronized using incremental position sensors only. This means that the computer program can be used in situations in which an absolute position of the steering wheel and/or an absolute position of the road wheel is unknown. This may be the case if an absolute position sensor is subject to an error on malfunction. As has been mentioned before, only incremental sensors are necessary for executing the method. This has the effect that redundant absolute position sensors are not necessary. This reduces the complexity of the steering system. Moreover, operational safety of a vehicle using such a steering system is enhanced.

According to a fifth aspect, there is provided a computer-readable storage medium comprising instructions which, when executed by a computer, cause the computer to carry out the method of the present disclosure. Using the computer-readable storage medium, a rotatory steering wheel position of a steering wheel and an angular road wheel position of a road wheel can be synchronized using incremental position sensors only. This means that the computer-readable storage medium can be used in situations in which an absolute position of the steering wheel and/or an absolute position of the road wheel is unknown. This may be the case if an absolute position sensor is subject to an error on malfunction. As has been mentioned before, only incremental sensors are necessary for executing the method. This has the effect that redundant absolute position sensors are not necessary. This reduces the complexity of the steering system. Moreover, operational safety of a vehicle using such a steering system is enhanced.

According to a sixth aspect, there is provided a steering system for a vehicle. The vehicle has at least one road wheel and a steering wheel. The steering system is configured to adjust an angular road wheel position of the road wheel based on a rotatory steering wheel position of the steering wheel. The steering system comprises a steering wheel actuator unit comprising a singular steering wheel absolute position sensor and at least one steering wheel incremental position sensor. Additionally, the steering system comprises a road wheel actuator unit comprising a singular road wheel absolute position sensor and at least one road wheel incremental position sensor. Furthermore, the steering system comprises a data processing apparatus of the present disclosure being communicatively connected to the steering wheel actuator unit and the road wheel actuator unit. Thus, compared to known steering systems, the steering system according to the present disclosure only comprises very few absolute position sensors. More precisely, redundant absolute position sensors are not necessary. This reduces the complexity of the steering system. At the same time, a rotatory steering wheel position of a steering wheel and an angular road wheel position of a road wheel can be synchronized using the steering system. This may be the case in situations in which the absolute position of the steering wheel and/or the absolute position of the road wheel is unknown, e.g., if an absolute position sensor is subject to an error on malfunction. As has been mentioned before, only incremental sensors are necessary for executing the method. Thus, in addition to the reduced complexity, the steering system is reliable.

It should be noted that the above examples may be combined with each other irrespective of the aspect involved.

These and other aspects of the present disclosure will become apparent from and elucidated with reference to the examples described hereinafter.

A method comprising causing at least one of a steering wheel to move into a steering wheel end stop position, wherein a rotatory position ($\beta$) of the steering wheel end stop position is known, and causing a road wheel to move into a road wheel end stop position, wherein an angular position ($\alpha$) of the road wheel end stop position is known; causing the steering wheel to move into a neutral steering wheel position based on the rotatory position ($\beta$) of the steering wheel end stop position using a first incremental position sensor detection result, and causing the road wheel to move into a neutral road wheel position based on the angular position ($\alpha$) of the road wheel end stop position using a second incremental position sensor detection result; and wherein the steering wheel and the road wheel are coupled to a steering system of a vehicle; and wherein the method is configured for synchronizing the rotatory position ($\beta$) of the steering wheel to the angular position ($\alpha$) of the road wheel.

A steering system comprising a steering wheel actuator unit comprising a singular steering wheel absolute position sensor and at least one steering wheel incremental position sensor; a road wheel actuator unit comprising a singular road wheel absolute position sensor and at least one road wheel incremental position sensor; and a data processing apparatus is communicatively connected to the steering wheel actuator unit and the road wheel actuator unit; and wherein the steering system is a component of a vehicle comprising at least a road wheel and a steering wheel; and wherein the steering system is configured to adjust an angular road wheel position ($\alpha$) of the road wheel based on a rotatory steering wheel position ($\beta$) of the steering wheel when at least one of the rotatory steering wheel position ($\beta$) and the angular road wheel position ($\alpha$) is unknown.

A non-transitory computer-readable storage medium having stored thereon instructions executable by a computer system to perform operations comprising causing at least one of a steering wheel to move into a steering wheel end stop position, wherein a rotatory position (β) of the steering wheel end stop position is known; and causing a road wheel to move into a road wheel end stop position, wherein an angular position (α) of the road wheel end stop position is known; causing the steering wheel to move into a neutral steering wheel position based on the rotatory position (β) of the steering wheel end stop position using a first incremental position sensor detection result; and causing the road wheel to move into a neutral road wheel position based on the angular position (α) of the road wheel end stop position using a second incremental position sensor detection result; and wherein the operations are configured for synchronizing the rotatory position (β) of the steering wheel to the angular position (α) of the road wheel; and wherein the steering wheel and the road wheel are coupled to a steering system of a vehicle.

BRIEF DESCRIPTION OF DRAWINGS

Examples of the disclosure will be described in the following with reference to the following drawings.

The Figures are merely schematic representations and serve only to illustrate examples of the disclosure. Identical or equivalent elements are in principle provided with the same reference signs.

DETAILED DESCRIPTION

Figure 1:
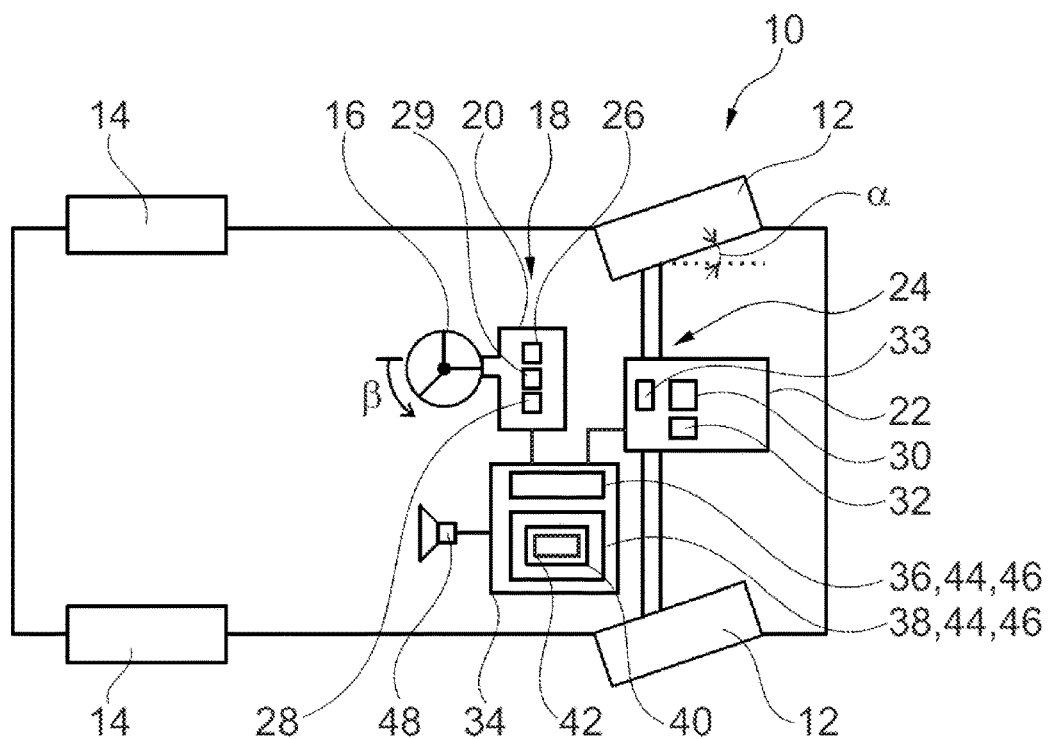
FIG. 1 shows a vehicle comprising a steering system according to the present disclosure comprising a data processing apparatus according to the present disclosure, a computer-readable storage medium according to the present disclosure and a computer program according to the present disclosure, wherein a method for starting a vehicle may be executed in connection with the vehicle and a method for synchronizing a rotatory steering wheel position of a steering wheel to an angular road wheel position of a road wheel may be used in connection with the steering system.
Figure 2:
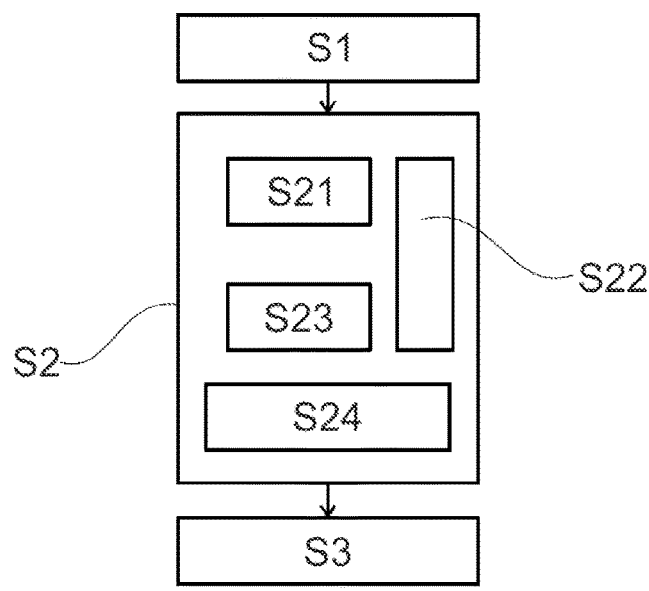
FIG. 2 illustrates steps of the method for starting a vehicle and the method for synchronizing a rotatory steering wheel position of a steering wheel to an angular road wheel position of a road wheel.

FIG. 1 shows a vehicle 10.

The vehicle 10 comprises front wheels 12 and rear wheels 14.

Additionally, the vehicle comprises a steering wheel 16.

The steering wheel 16 and the front wheels 12 are coupled by a steering system 18.

The steering system 18 is configured to adjust an angular road wheel position indicated by angle α of the front wheels 12 based on a rotatory steering wheel position indicated by angle β of the steering wheel 16.

Since in the present example, only the front wheels 12 are connected to the steering system 18, they may be called road wheels in a more general manner. Thus, the term front wheels 12 and road wheels will be used as synonyms in the following.

In the present example, the steering system 18 is a steer-by-wire system.

The steering system 18 comprises a steering wheel actuator unit 20 which is coupled to the steering wheel 16.

Moreover, the steering system 18 comprises a road wheel actuator unit 22. The road wheel actuator unit 22 is coupled to the front wheels 12 via a rack and pinion mechanism 24.

The steering wheel actuator unit 20 comprises a singular steering wheel absolute position sensor 26 being configured to generate an absolute position sensor detection result and one steering wheel incremental position sensor 28 being configured to generate an incremental position sensor detection result.

Moreover, the steering wheel actuator unit 20 comprises a steering wheel abutment force sensor 29.

The steering wheel abutment force sensor 29 is configured to detect an abutment force by which the steering wheel 16 abuts against an end stop in the steering wheel end stop position. Based thereon, the steering wheel abutment force sensor 29 is able to create an abutment force information being representative of the abutment force.

Also, the road wheel actuator unit 22 comprises a singular road wheel absolute position sensor 30 being configured to generate an absolute position sensor detection result and one road wheel incremental position sensor 32 being configured to generate an incremental position sensor detection result.

Moreover, the road wheel actuator unit 22 comprises a road wheel abutment force sensor 33.

The road wheel abutment force sensor 33 is configured to detect an abutment force by which the road wheel 12 abuts against an end stop in the road wheel end stop position. Based thereon, the road wheel abutment force sensor 33 is able to create an abutment force information being representative of the abutment force.

The steering system 18 further comprises a data processing apparatus 34.

The data processing apparatus 34 is communicatively connected to the steering wheel actuator unit 20 and the road wheel actuator unit 22.

The data processing apparatus 34 comprises a data storage unit 36 and a data processing unit 38.

The data storage unit 36 comprises a computer-readable storage medium 40.

On the computer-readable storage medium 40, there is provided a computer program 42.

Both the computer-readable storage medium 40 and the computer program 42 comprise instructions which, when executed by the data processing unit 38 or, more generally, a computer, cause the data processing unit 38 or the computer to carry out a method for starting the vehicle 10.

Consequently, the data storage unit 36 and the data processing unit 38 form means 44 for carrying out the method for starting the vehicle 10.

As will be explained in more detail further below, the method for starting the vehicle 10 comprises executing a method for synchronizing a rotatory steering wheel position β of a steering wheel 16 to an angular road wheel position α of a road wheel 12.

Thus, the computer-readable storage medium 40 and the computer program 42 additionally comprise instructions which, when executed by the data processing unit 38 or, more generally, a computer, cause the data processing unit 38 or the computer to carry out the method for synchronizing a rotatory steering wheel position β of a steering wheel 16 to an angular road wheel position α of a road wheel 12.

Consequently, the data storage unit 36 and the data processing unit 38 also form means 46 for carrying out the method for synchronizing a rotatory steering wheel position of a steering wheel 16 to an angular road wheel position of a road wheel 12.

In the following, the method for starting the vehicle 10 is explained.

This method comprises three steps S1, S2, S3.

In a first step S1, the method determines that at least one of the rotatory steering wheel position β and the angular road wheel position α is unknown. This may be the case if at least one of the steering wheel absolute position sensor 26 and the road wheel absolute position sensor 30 is subject to an error.

In the present example, it is assumed that both the steering wheel absolute position sensor 26 and the road wheel absolute position sensor 30 are subject to an error. This means that an absolute position of the steering wheel 16 and an absolute position of the road wheel 12 is unknown.

In a subsequent second step S2, the method for synchronizing a rotatory steering wheel position β of a steering wheel 16 to an angular road wheel position α of a road wheel 12 is executed.

In order to be able to better distinguish between the steps of the method for starting the vehicle and the steps of the method for synchronizing a rotatory steering wheel position β of a steering wheel 16 to an angular road wheel position α of a road wheel 12, the steps of the method for synchronizing a rotatory steering wheel position β of the steering wheel 16 to an angular road wheel position α of the road wheel 12 will be indicated by a reference signs S2x.

In order to further facilitate the following explanations, the method for synchronizing a rotatory steering wheel position β of a steering wheel 16 to an angular road wheel position α of a road wheel 12 will be simply called a method for synchronizing.

In a first step S21 of the method for synchronizing, the steering wheel 16 is caused to move into a steering wheel end stop position.

Additionally, the road wheels 12 is caused to move into a corresponding end stop position.

In other words, both the steering wheel 16 and the road wheels 12 are moved either into a left end stop position or a right end stop position.

If the steering wheel 16 reaches the end stop position, an abutment force information is generated by the steering wheel abutment force sensor 29 and is received at the data processing apparatus 34.

This abutment force information is compared to a reference abutment force information which is stored on the data storage unit 36.

Based on this comparison, a confirmation that the steering wheel 16 has reached the end stop position is generated if the received abutment force information and the reference abutment force information differ by a predefined difference threshold or less.

In the same manner, if the road wheels 12 reach the end stop position, an abutment force information being generated by the road wheel abutment force sensor 33 is received at the data processing apparatus 34.

This abutment force information is compared to a reference abutment force information which is stored on the data storage unit 36.

Based on this comparison, a confirmation that the road wheels 12 have reached the end stop position is generated if the received abutment force information and the reference abutment force information differ by a predefined difference threshold or less.

A second step S22 of the method for synchronizing is executed in parallel to the first step S21. The second step S22 triggers a warning message for a user of the vehicle 10. In the present example, the warning message is an acoustic message which is delivered to a passenger compartment of the vehicle 10 by a loudspeaker 48. The loudspeaker 48 is communicatively connected to the data processing apparatus 34.

It is understood that in other examples, the warning message may be of any other appropriate type.

In a third step S23 of the method for synchronizing, the steering wheel 16 is caused to move into a neutral steering wheel position.

Moreover, the road wheels 12 are caused to move into the neutral road wheel position.

In order to do so, the fact that a rotatory position β of the steering wheel end stop position is known and the fact that an angular position α of the road wheel end stop position is known are used.

Both the known rotatory position β of the steering wheel end stop position and the known angular position α of the road wheel end stop position are stored on the data storage unit 36.

Additionally, the steering wheel incremental position sensor 28 and the road wheel incremental position sensor 32 are used. The sensors are not subject to an error.

In other words, the steering wheel 16 is caused to move into a neutral steering wheel position wherein an incremental position sensor detection result of the steering wheel incremental position sensor 28 is used. The road wheels 12 are caused to move into a neutral road wheel position wherein an incremental position sensor detection result of the road wheel incremental position sensor 32 is used.

Again, a warning message may be issued while the road wheels 12 and the steering wheel 16 are moving, i.e., the execution of step S22 is continued.

In other words, now a rotatory steering wheel position β of the steering wheel 16 and an angular road wheel position α of the road wheels 12 is known.

Thereafter, in a fourth step S24 of the method for synchronizing, a confirmation message for the user of the vehicle 10 may be triggered if the steering wheel 16 has reached the neutral steering wheel position and the road wheels 12 have reached the neutral road wheel position. In the present example, the confirmation message is an acoustic message which is provided to the user of the vehicle 10 by the loudspeaker 48.

Thereafter, in a third step S3 of the method for starting the vehicle, a use of the steering system 18 is permitted.

In the above explanation of the method for synchronizing, both the steering wheel 16 and the road wheels 12 could be moved into the corresponding end stop positions without any problem.

In order to be able to react to situations in which at least one of the road wheels 12 and the steering wheel 16 cannot be moved into the desired end stop position, the method may comprise the following optional steps.

The fact that at least one of the steering wheel 16 and the road wheels 12 may not be moved into the corresponding end stop position may cause the generation of an obstacle information.

This obstacle information obviously relates to one of the left steering wheel end stop position and the right steering wheel end stop position, if the steering wheel 16 is blocked from reaching the corresponding end stop position.

In a case in which the road wheels 12 are blocked from reaching the corresponding end stop position, the obstacle information relates to one of the left road wheel end stop position at the right road wheel end stop position.

The obstacle information is received at the data processing apparatus 34.

Following the obstacle information, the steering wheel 16 and the road wheel 12 are caused to move into the respective other steering wheel end stop position and the respective other road wheel end stop position.

This means that the method for synchronizing can also be executed in a case in which moving at least one of the steering wheel 16 and the road wheels 12 into one of the corresponding end stop positions is blocked.

Additionally, or alternatively, the method may comprise the following optional steps which limit wear occurring in the end stop positions of the steering wheel 16 and/or the road wheel 12.

According to this option, causing the steering wheel 16 to move into a neutral steering wheel position comprises causing the steering wheel 16 to move into an intermediate steering wheel position and causing the steering wheel 16 to temporarily stop in the intermediate steering wheel position.

This means that the steering wheel 16 only needs to stay in its end stop position for a comparatively short time.

In the same manner, causing the road wheels 12 to move into the neutral road wheel position comprises causing the road wheels 12 to move into an intermediate road wheel position and causing the road wheels 12 to temporarily stop in the intermediate road wheel position. Also in this case, the road wheels 12 only need to stay in the corresponding end stop position for a comparatively short time.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

A computer program (also known as a program, software, software application, script, or code) is written in any appropriate form of programming language, including compiled or interpreted languages. Any appropriate form, including a standalone program or a module, component, subroutine, or other unit suitable for use in a computing environment may deploy it. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may execute on one computer or on multiple computers that are located at one site or distributed across multiple sites and interconnected by a communication network.

A computing device or system may include a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components, may realize implementations described herein. Any appropriate form or medium of digital data communication, e.g., a communication network may interconnect the components of the system. Examples of communication networks include a Local Area Network (LAN) and a Wide Area Network (WAN), e.g., Intranet and Internet.

The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

The computing system may include clients and servers. A client and server are remote from each other and typically interact through a communication network. The relationship of the client and server arises by virtue of computer programs running on the respective computers and having a client-server relationship with each other.

As used herein the term "component" refers to a distinct and identifiable part, element, subsystem, or unit within a larger system, structure, or entity. It is a building block that serves a specific function or purpose within a more complex whole. Components are often designed to be modular and interchangeable, allowing them to be combined or replaced in various configurations to create or modify systems. Components may be a combination of mechanical, electrical, hardware, firmware, software and/or other engineering elements.

The terms "non-transitory computer-readable storage medium" and "machine-readable storage medium" include a single medium or multiple media such as a centralized or distributed database, and/or associated caches and servers that store one or more sets of instructions. Further, the terms "non-transitory machine-readable storage medium" and "machine-readable storage medium" include any tangible medium that is capable of storing, encoding, or carrying a set of instructions for execution by a processor that, for example, when executed, cause a system to perform any one or more of the methods or operations disclosed herein. As used herein, the term "machine-readable storage medium" is expressly defined to include any type of computer-readable storage device and/or storage disk and to exclude propagating signals.

In addition, a non-transitory machine-readable medium and/or a system may embody the various operations, processes, and methods disclosed herein. Accordingly, the specification and drawings are illustrative rather than restrictive.

Physical computer-readable storage media includes RAM, ROM, EEPROM, CD-ROM or other optical disk storage (such as CDs, DVDs, etc.), magnetic disk storage or other magnetic storage devices, solid-state disks or any other medium. They store desired program code in the form of computer-executable instructions or data structures which can be accessed by a general purpose or special purpose computer.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter herein described is in a language specific to structural features and/or methodological acts, the described features or acts described do not limit the subject matter defined in the claims. Rather, the herein described features and acts are example forms of implementing the claims.

Further, a computer system including one or more processors and machine-readable storage media such as computer memory may practice the methods. In particular, one or more processors execute computer-executable instructions, stored in the computer memory, to perform various functions such as the acts recited in the embodiments.

As used herein the term "data processing unit" may be used interchangeably with processor in many contexts. Both terms generally refer to a component or unit within a computing system that is responsible for carrying out operations on data. The processor, or central processing unit (CPU), is an element of a computer that performs arithmetic and logic operations, executes instructions from computer programs, and manages data movement within the system.

One or more programmable processors, executing one or more computer programs to perform functions by operating on input data and generating output, perform the processes and logic flows described in this specification. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of digital computer. A processor will receive instructions and data from a read-only memory or a random-access memory or both. Elements of a computer can include a processor for performing instructions and one or more memory devices for storing instructions and data. A computer will also include, or is operatively coupled to receive data, transfer data or both, to/from one or more mass storage devices for storing data e.g., magnetic disks, magneto optical disks, optical disks, or solid-state disks. However, a computer need not have such devices. Moreover, another device, e.g., a mobile telephone, a personal digital assistant (PDA), a mobile audio player, a Global Positioning System (GPS) receiver, etc. may embed a computer. Machine-readable storage media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. Special purpose logic circuitry may supplement or incorporate the processor and the memory.

Digital electronic circuitry, or in computer software, firmware, or hardware, including the structures disclosed in this specification and their structural equivalents, or in combinations of one or more of them may realize the implementations and all of the functional operations described in this specification. Implementations may be as one or more computer program products i.e., one or more modules of computer program instructions encoded on a machine-readable storage medium for execution by, or to control the operation of, data processing apparatus. The machine-readable storage medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

Aspects of the one or more embodiments described herein are described with reference to flowchart illustrations and/or block diagrams of methods, apparatus (systems), and computer program products according to one or more embodiments described herein. Each block of the flowchart illustrations and/or block diagrams, and combinations of blocks in the flowchart illustrations and/or block diagrams, can be implemented by machine-readable storage program instructions. These computer-readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer-readable program instructions can also be stored in a computer-readable storage medium that can direct a computer, a programmable data processing apparatus and/or other devices to function in a particular manner, such that the computer-readable storage medium having instructions stored therein can comprise an article of manufacture including instructions which can implement aspects of the function/act specified in the flowchart and/or block diagram block or blocks. The computer-readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

LIST OF REFERENCE SIGNS 10 vehicle
12 front wheel
14 rear wheel
16 steering wheel
18 steering system
20 steering wheel actuator unit
22 road wheel actuator unit
24 rack and pinion mechanism
26 steering wheel absolute position sensor
28 steering wheel incremental position sensor
29 steering wheel abutment force sensor
30 road wheel absolute position sensor
32 road wheel incremental position sensor
33 road wheel abutment force sensor
34 data processing apparatus
36 data storage unit
38 data processing unit
40 computer-readable storage medium
42 computer program
44 means for carrying out the method for starting a vehicle
46 means for carrying out the method for synchronizing a rotatory steering wheel position of a steering wheel to an angular road wheel position of a road wheel
48 loudspeaker
$\alpha$ angular road wheel position or angular position of the road wheel
$\beta$ rotatory steering wheel position or rotatory position of the steering wheel
S1 first step of the method for starting a vehicle
S2 second step of the method for starting a vehicle
S21 first step of the method for synchronizing
S22 second step of the method for synchronizing
S23 third step of the method for synchronizing
S24 fourth step of the method for synchronizing
S3 third step of the method for starting a vehicle

What is claimed is:

1. A method comprising:
causing a steering wheel to move into a steering wheel end stop position, wherein a rotatory position ($\beta$) of the steering wheel end stop position is known, and causing a road wheel to move into a road wheel end stop position, wherein an angular position ($\alpha$) of the road wheel end stop position is known;
causing the steering wheel to move into a neutral steering wheel position based on the rotatory position ($\beta$) of the steering wheel end stop position using a first incremental position sensor detection result; and
causing the road wheel to move into a neutral road wheel position based on the angular position ($\alpha$) of the road wheel end stop position using a second incremental position sensor detection result; and
wherein the steering wheel and the road wheel are coupled to a steering system of a vehicle; and
wherein the method is configured for synchronizing the rotatory position ($\beta$) of the steering wheel to the angular position ($\alpha$) of the road wheel.

2. The method of claim 1, further comprising receiving at least one of the rotatory position ($\beta$) of the steering wheel end stop position and the angular position ($\alpha$) of the road wheel end stop position from a data storage.

3. The method of claim 1, wherein the steering wheel end stop position is one of a left steering wheel end stop position and a right steering wheel end stop position.

4. The method of claim 3, wherein the road wheel end stop position is one of a left road wheel end stop position and a right road wheel end stop position and corresponds to a respective end stop position of the steering wheel.

5. The method of claim 3, further comprising:
receiving an obstacle information relating to one of the left steering wheel end stop position and the right steering wheel end stop position; and
causing the steering wheel to move into a respective other steering wheel end stop position.

6. The method of claim 4, further comprising:
receiving an obstacle information relating to one of the left road wheel end stop position and the right road wheel end stop position, and
causing the road wheel to move into a respective other road wheel end stop position.

7. The method of claim 1, wherein causing the steering wheel to move into the neutral steering wheel position comprises causing the steering wheel to move into an intermediate steering wheel position and causing the steering wheel to temporarily stop in the intermediate steering wheel position.

8. The method of claim 1, wherein causing the road wheel to move into the neutral road wheel position comprises causing the road wheel to move into an intermediate road wheel position and causing the road wheel to temporarily stop in the intermediate road wheel position.

9. The method of claim 1, wherein causing the steering wheel to move into the steering wheel end stop position comprises receiving a confirmation that the steering wheel has reached the steering wheel end stop position.

10. The method of claim 1, wherein causing the road wheel to move into the road wheel end stop position comprises receiving an abutment force information.

11. The method of claim 10, further comprising receiving a reference abutment force information and comparing the reference abutment force information to the abutment force information.

12. The method of claim 1, further comprising triggering a warning message for a user of the vehicle while causing at least one of the steering wheel to move and the road wheel to move.

13. The method of claim 1, further comprising triggering a confirmation message for a user of the vehicle when the steering wheel has reached the neutral steering wheel position.

14. The method of claim 1, further comprising triggering a confirmation message for a user of the vehicle when the road wheel has reached the neutral road wheel position.

15. The method of claim 1, wherein the method further comprises,
   determining that at least one of the rotatory position ($\beta$) of the steering wheel and the angular position ($\alpha$) of the road wheel is unknown;
   executing the method for synchronizing a rotatory position ($\beta$) of the steering wheel to the angular position ($\alpha$) of the road wheel; and
   permitting a use of the steering system; and
   wherein the method is configured to be executed for starting the vehicle.

16. A steering system comprising
   a steering wheel actuator unit comprising a singular steering wheel absolute position sensor and at least one steering wheel incremental position sensor;
   a road wheel actuator unit comprising a singular road wheel absolute position sensor and at least one road wheel incremental position sensor; and
   a data processing apparatus, wherein the data processing apparatus is communicatively connected to the steering wheel actuator unit and the road wheel actuator unit; and
   wherein the steering system is a component of a vehicle comprising at least a road wheel and a steering wheel; and
   wherein the steering system is configured to adjust an angular road wheel position ($\alpha$) of the road wheel based on a rotatory steering wheel position ($\beta$) of the steering wheel when at least one of the rotatory steering wheel position ($\beta$) and the angular road wheel position ($\alpha$) is unknown by moving at least one of the steering wheel into a steering wheel end stop position, wherein the rotatory steering wheel position ($\beta$) of the steering wheel end stop position is known, and the road wheel into a road wheel end stop position, wherein angular road wheel position ($\alpha$) of the road wheel end stop position is known; moving the steering wheel to a neutral steering wheel position based on the steering wheel incremental position sensor detection result and the road wheel to a neutral road wheel position based on the road wheel incremental position sensor detection result; and thereby synchronizing the rotatory steering wheel position ($\beta$) to the angular road wheel position ($\alpha$).

17. The steering system of claim 16, wherein the steering system further comprises a steering wheel abutment force sensor and a road wheel abutment force sensor.

18. The steering system of claim 16, wherein the singular steering wheel absolute position sensor is configured to generate an absolute position sensor detection result of the steering wheel and the steering wheel incremental position sensor is configured to generate an incremental position sensor detection result of the steering wheel; and wherein the singular road wheel absolute position sensor is configured to generate an absolute position sensor detection result of the road wheel and the road wheel incremental position sensor is configured to generate an incremental position sensor detection result of the road wheel.

19. The system of claim 16, wherein the steering system is a steer-by-wire system.

20. A non-transitory computer-readable storage medium having stored thereon instructions executable by a computer system to perform operations comprising:
   causing at least one of a steering wheel to move into a steering wheel end stop position, wherein a rotatory position ($\beta$) of the steering wheel end stop position is known; and causing a road wheel to move into a road wheel end stop position, wherein an angular position ($\alpha$) of the road wheel end stop position is known;
   causing the steering wheel to move into a neutral steering wheel position based on the rotatory position ($\beta$) of the steering wheel end stop position using a first incremental position sensor detection result; and
   causing the road wheel to move into a neutral road wheel position based on the angular position ($\alpha$) of the road wheel end stop position using a second incremental position sensor detection result; and
   wherein the operations are configured for synchronizing the rotatory position ($\beta$) of the steering wheel to the angular position ($\alpha$) of the road wheel; and
   wherein the steering wheel and the road wheel are coupled to a steering system of a vehicle.

* * * * *